United States Patent [19]

Shindo

[11] Patent Number: 5,260,734
[45] Date of Patent: Nov. 9, 1993

[54] DETERMINING A DIRECTION IN WHICH AN EYE GAZES

[75] Inventor: Osamu Shindo, Tokyo, Japan

[73] Assignee: Asahi Kogaku Kogyo Kabushiki Kaisha, Tokyo, Japan

[21] Appl. No.: 974,327

[22] Filed: Nov. 10, 1992

Related U.S. Application Data

[63] Continuation of Ser. No. 619,975, Nov. 30, 1990, abandoned.

[30] Foreign Application Priority Data

Nov. 30, 1989 [JP] Japan .................................. 1-311726

[51] Int. Cl.$^5$ ...................... G03B 13/02; G03B 17/00; A61B 3/14
[52] U.S. Cl. .................................. 354/219; 354/402; 351/210
[58] Field of Search ............... 354/400, 402, 410, 432, 354/62, 219; 351/210

[56] References Cited

U.S. PATENT DOCUMENTS

| Re. 31,370 | 9/1983 | Mashimo et al. | 354/402 |
|---|---|---|---|
| 4,047,187 | 9/1977 | Mashimo et al. | 354/402 |
| 4,183,642 | 1/1980 | Fukuoka | 354/402 |
| 4,743,932 | 5/1988 | Matsui | 354/403 |
| 4,786,934 | 11/1988 | Kunze et al. | 354/409 |
| 4,950,069 | 8/1990 | Hutchinson | 351/210 |
| 4,974,010 | 11/1990 | Cleveland et al. | 351/210 X |
| 4,975,772 | 12/1990 | Fujita | 358/166 |
| 4,980,716 | 12/1990 | Suzuki et al. | 354/403 |
| 5,036,347 | 7/1991 | Tsunekawa et al. | 354/400 |
| 5,155,516 | 10/1992 | Shindo | 354/219 |

FOREIGN PATENT DOCUMENTS

| 3331264 | 3/1984 | Fed. Rep. of Germany . |
|---|---|---|
| 3530011 | 3/1987 | Fed. Rep. of Germany . |
| 3841575 | 7/1989 | Fed. Rep. of Germany . |
| 60-032012 | 2/1985 | Japan . |
| 60-041013 | 3/1985 | Japan . |
| 62-047612 | 3/1987 | Japan . |
| 62-189415 | 8/1987 | Japan . |
| 1277533 | 8/1989 | Japan . |
| 1241511 | 9/1989 | Japan . |

OTHER PUBLICATIONS

English Language Abstract of Japanese 60-41013, Mar. 1985.
English Language Abstract of Japanese 62-47612, Mar. 1987.
English Language Abstract of Japanese 62-189415, Aug. 1987.
Methods and Design—Survey of Eye Movement Recording Methods, by Young and Sheena, Behavior Research Methods and Instrumentation, pp. 397-429 (vol. 7(5), 1975).

*Primary Examiner*—W. B. Perkey
*Attorney, Agent, or Firm*—Sandler, Greenblum & Bernstein

[57] ABSTRACT

An eye direction detection apparatus has a light emitting system, a light receiving system, a detecting circuit, a memory and a circuit for correcting signals stored in the memory. The apparatus detects the eye direction by subtracting an error signal stored in the memory from video signals produced by the detecting circuit.

15 Claims, 8 Drawing Sheets

DETERMINING A DIRECTION IN WHICH AN EYE GAZES

This application is a continuation of application Ser. No. 07/619,975, filed Nov. 30, 1990, now abandoned.

BACKGROUND OF THE INVENTION

1. Field of the Invention

This invention relates to an eye direction detecting apparatus for finding an eye direction or a gaze point of a user's eye in a finder system.

2. Description of the Prior Art

An eye direction detecting apparatus is known in which the apparatus makes incident a light bundle to a photographer's eye, and detects the reflection light of the eye in the shape of video signals, and then calculates a revolving angle of the eye based upon the video signals.

However, the above-mentioned eye direction detecting apparatus generally uses some optical units in common with the light emitting system and the light receiving system. The detected signal includes noise signals as the ghost signals generated from the common optical units.

Figure 8:
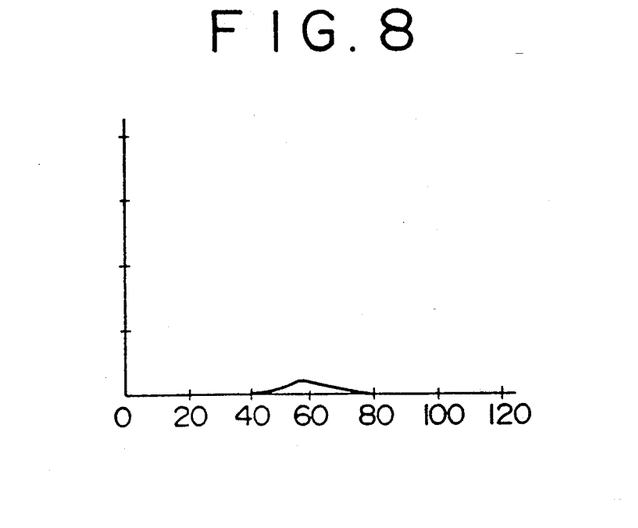
FIG. 8 through FIG. 11 are graphs showing examples of video signals outputted from a conventional eye direction detecting apparatus.

FIG. 8 shows data representing ghost signals generated from the above-mentioned conventional apparatus' optical system. In FIG. 8, an abscissa shows a bit number of the CCD line sensor, and an ordinate shows an amount of light as the ghost signals.

Such ghost signals deform the video signals for detection of the eye direction. Examples of the shapes of deformed video signals are shown in FIG. 9, FIG. 10 and FIG. 11.

Figure 9:
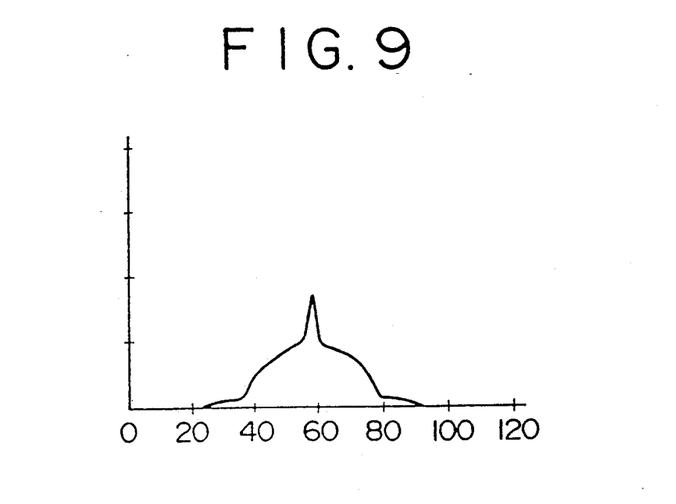

FIG. 9 shows a case in which a photographer's eye direction is in the center of a finder. In this case, it seems that there is little disturbance in processing of the data. But actually, ghost signals influences the accuracy, of the eye direction measurement to some degree.

Figure 10:
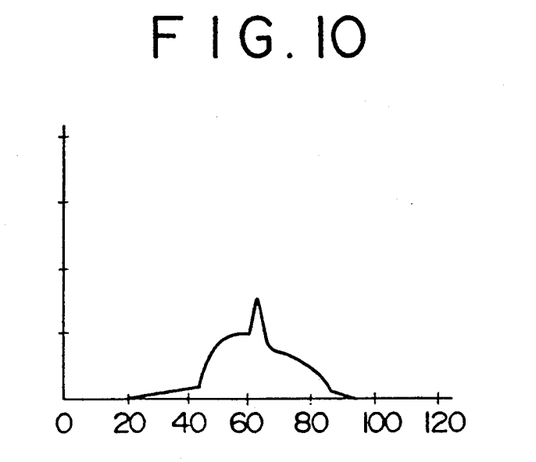
Figure 11:
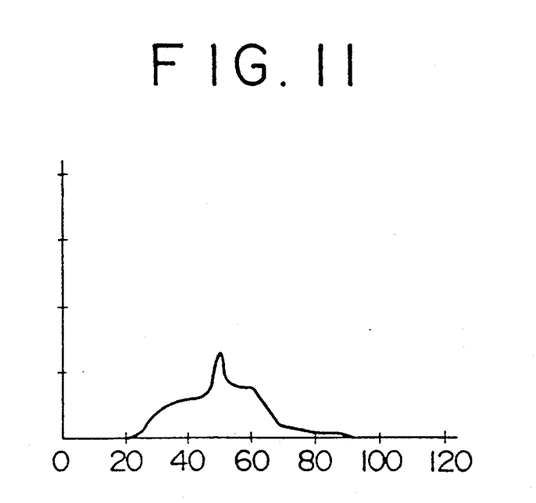

FIG. 10 shows a case in which the photographer's eye direction is in the right direction of the finder. In this case, the left side of the output video signals' shape is lifted a greater deal. When the photographer's eye direction is in the left direction of the finder, as shown in FIG. 11, the right side of the output video signals' shape is lifted a great deal. These deformations of the video signals influences much the accuracy of the eye direction measurement.

Figure 12:
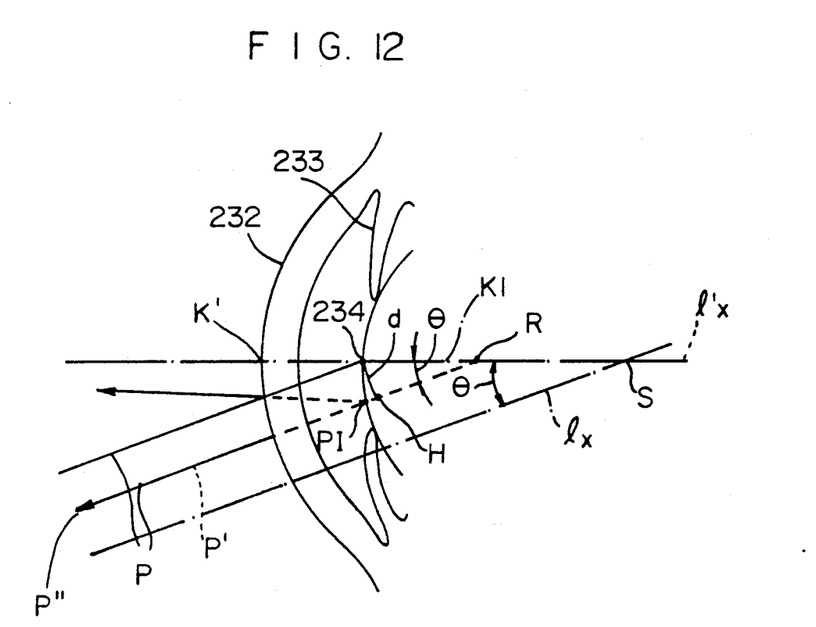

FIG. 12 illustrates an enlarged view of an eye to explain a relationship between a first Purkinje image and the center of an eye.

SUMMARY OF THE INVENTION

The present invention has been accomplished in view of the above problems. It is therefore an object of the present invention to supply an eye direction detecting apparatus which can eliminate harmful ghost signals that are generated from the optical systems of the apparatus.

The eye direction detecting apparatus of this invention, in order to attain the above mentioned object, is characterized in memorizing video signals as error signals peculiar in this apparatus' optical system, and subtracting the memorized error signals from video signals outputted from the light receiving device when there is reflecting light from the photographer's eye, and then detecting the eye direction based on the subtracted output signals.

By the above-mentioned, the eye direction detecting apparatus of this invention can get output signals in which the influence of ghost signals are eliminated. Consequently, one can detect the eye direction with increased precision.

DETAILED DESCRIPTION OF THE EMBODIMENTS

The present disclosure relates to subject matter contained in Japanese patent application No. HEI 1-311726 (filed on Nov. 30, 1989) which is expressly incorporated herein by reference in its entirety.

FIGS. 1 through 7 show an embodiment of an eye direction detecting apparatus according to the present invention.

First of all, an overall construction of the optical system of this apparatus will be schematically described with reference to FIG. 1.

Figure 1:
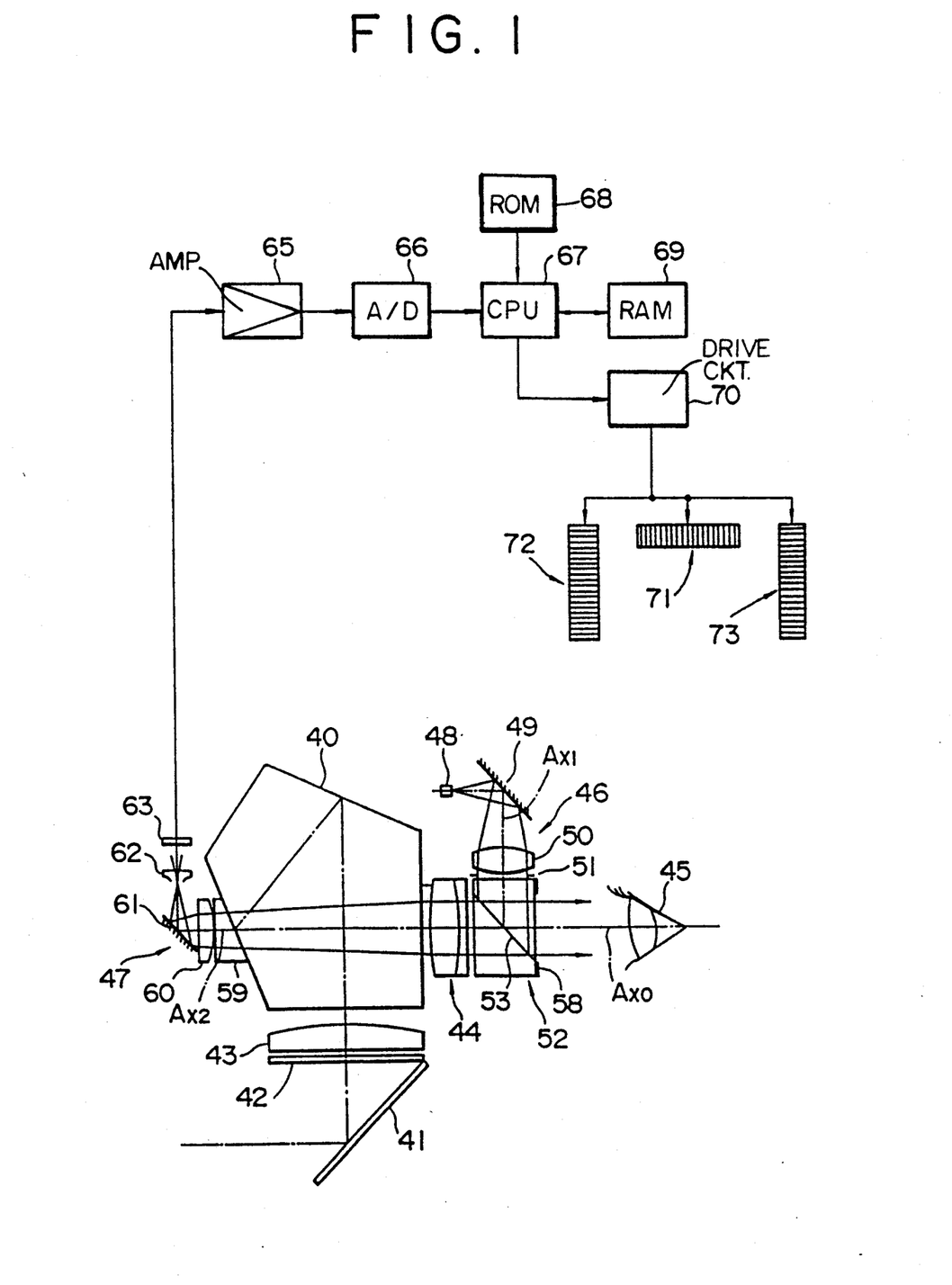
FIG. 1 is a schematic view showing a general construction of an eye direction detecting apparatus incorporated in a single lens reflex camera according to an embodiment of the present invention.
Figure 2:
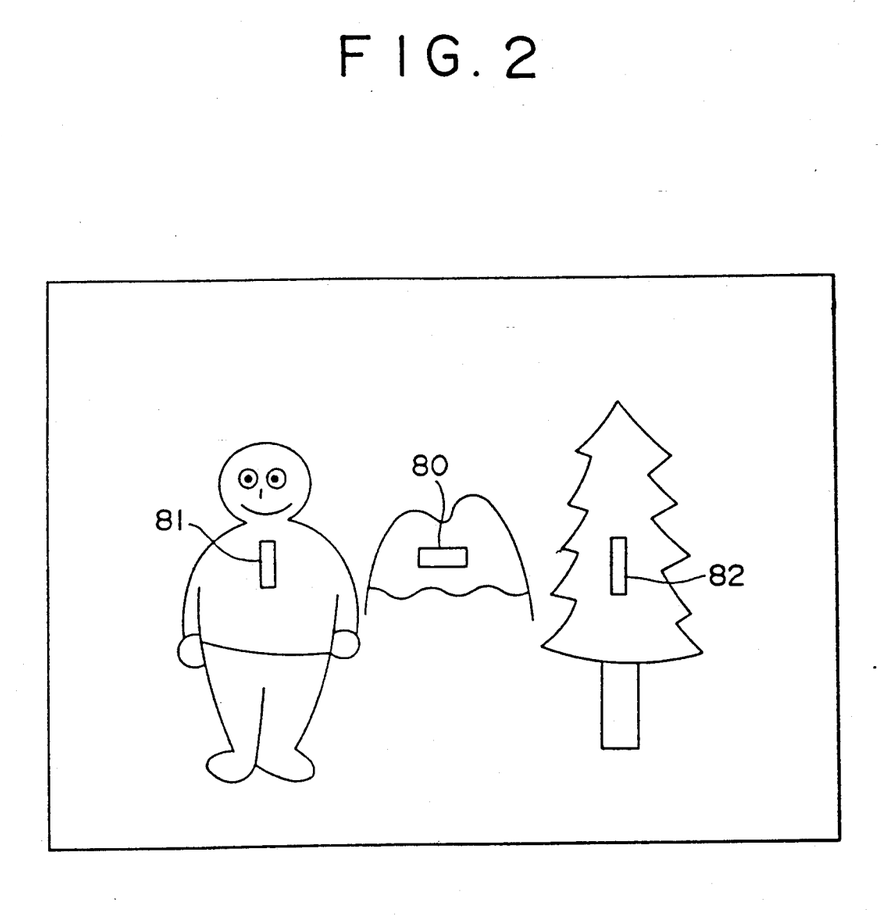
FIG. 2 is an explanatory view showing an example of a field of a view of the single lens reflex camera.

In FIG. 1, 40 denotes a pentagonal prism built in a camera, 41 a quick return mirror, 42 a focusing plate, 43 a condenser lens, 44 a finder magnifying lens, 45 an eye of an photographer, and Ax0 the optical axis of the finder system. The camera is provided with three focus detecting optical systems (not illustrated), and focus detecting zones 80, 81, 82, corresponding to the focus detecting systems, are located in the finder, as shown in FIG. 2.

An eye direction detecting optical system has a light emitting system 46 and a light receiving system 47. The light emitting system 46 emits a detecting light as a parallel light bundle to an eye 45 of a photographer who gazes through the finder. The light receiving system 47 detects a light reflected by the eye 45.

The light emitting system 46 has an infrared light emitting diode 48, a total reflection mirror 49, and a collimator lens 50. An infrared light emitted from the light emitting diode 48 is reflected by the total reflection mirror 49, and is made incident to collimator lens 50. The collimator lens 50 is provided at its outgoing side surface with a diaphragm 51. The collimator lens 50 functions to convert the infrared light emitted by the light emitting diode 48 into a parallel light bundle.

At the side of the finder magnifying lens 44 where an eye 45 is faced with, there is provided a light path overlapping optical member 52 for making an optical axis Ax1 of an light emitting system 46 and the optical axis Ax2 of the light receiving system 47 overlapping. The light path overlapping optical member 52 comprises two rectangular parallelpiped lens comprising prisms having a reflecting surface 53.

The reflecting surface 53 employed in this embodiment semitransmits an infrared light and a visible light. Since the reflecting surface 53 transmits a visible light, the photographer can see an image of the subject formed on a focusing plate 42. The parallel light bundle passed through the diaphragm 51 is reflected by the reflecting surface 53 to the direction of the eye 45 and projected to the eye 45 of the photographer placed at an eye point.

The light bundle for forming a first Purkinje image based upon a corneal specular reflection of the eye 45 and the reflecting light bundle from a retina pass through the reflecting surface 53 of the coaxis forming optical member 52 and is then guided to the finder magnifying lens 44.

The light receiving system 47 comprises a compensator prism 59, a magnifying lens 60, a total reflection mirror 61, a reimaging lens 62, and a CCD line sensor 63.

The compensator prism 59 compensates the optical characteristics, such as the optical path and phase differences of the exit light of the pentagonal prism 40. The magnifying lens 60 shortens the optical path of the light receiving system 47, and converges the exit light on a possibly narrow light receiving area of the CCD line sensor 63, so that it makes the sensitivity of the CCD line sensor relatively high. The reimaging lens 62 reimages the exit light on the CCD line sensor.

The CCD line sensor 63 and the pupil of the photographer's eye 45 are at an optically conjugate position through the finder magnifying lens 44, the minifying lens 60, and the reimaging lens 62. The light bundle for forming the first Purkinje image based on the corneal specular reflection of the eye 45 and the reflecting light bundle from the retina pass through the finder magnifying lens 44, and are guided to the reimaging lens 62 through the pentagonal prism 40, the compensator prism 59, the minifying lens 60 and the total reflection mirror 61. Then it forms a silhouette of the edge of the pupil and the first Purkinje image on the CCD line sensor 63.

Video signals outputted from the CCD line sensor 63 are amplified by the amplifier and then converted to digital signals by an A/D converter 66.

Digital output signals of the A/D convertor 66 are inputted to a CPU 67, which is used as a judgement means and a selecting means in such a state that reflected light elements from the eye 45 and ghost elements reflected from lens surfaces, etc., are mixed. CPU 67 subtracts error signals shown in FIG. 9 from the video signals that are including ghost signals memorized in ROM 68, which is used as a memorizing means. The video signals, in which the peculiar ghost signals of the optical system are eliminated, are temporarily stored in a RAM 69.

The ghost signals memorized in the ROM 68 are digital signals outputted from A/D convertor 66 when the photographer's eye 45 is not placed in front of the finder; and they are correction data that correspond with picture elements of the CCD 63.

The ROM 68 comprises for example, a E$^2$PROM (Electronically Erasable Programmable Read Only Memory). Error data are written in the ROM 68 on every camera or every production lot. The error data are supplied from the CPU of a camera or outer computer connected to a camera.

Figure 3:
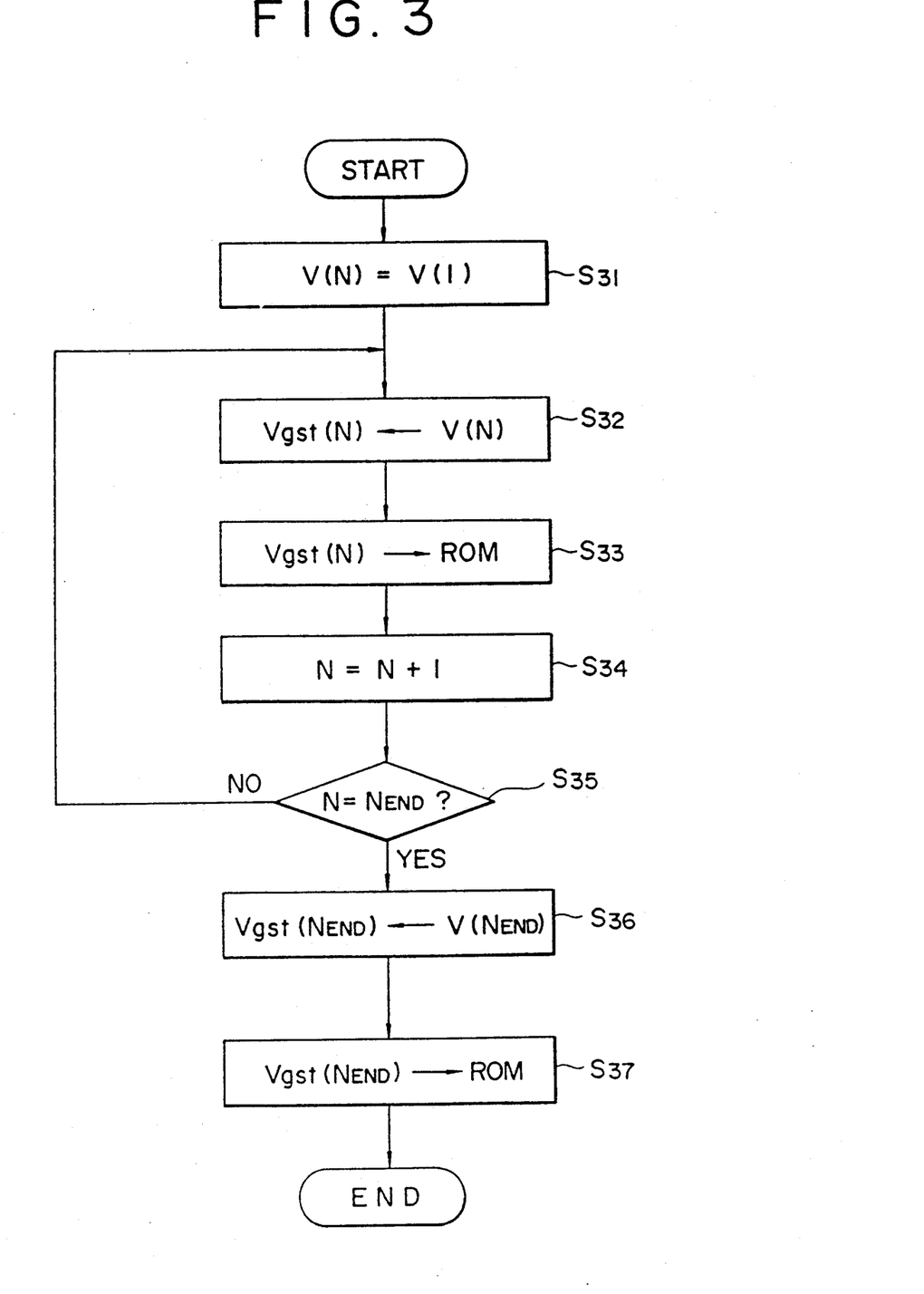
FIG. 3 and FIG. 4 are examples of flow charts showing processes of correction of video signals.
Figure 4:
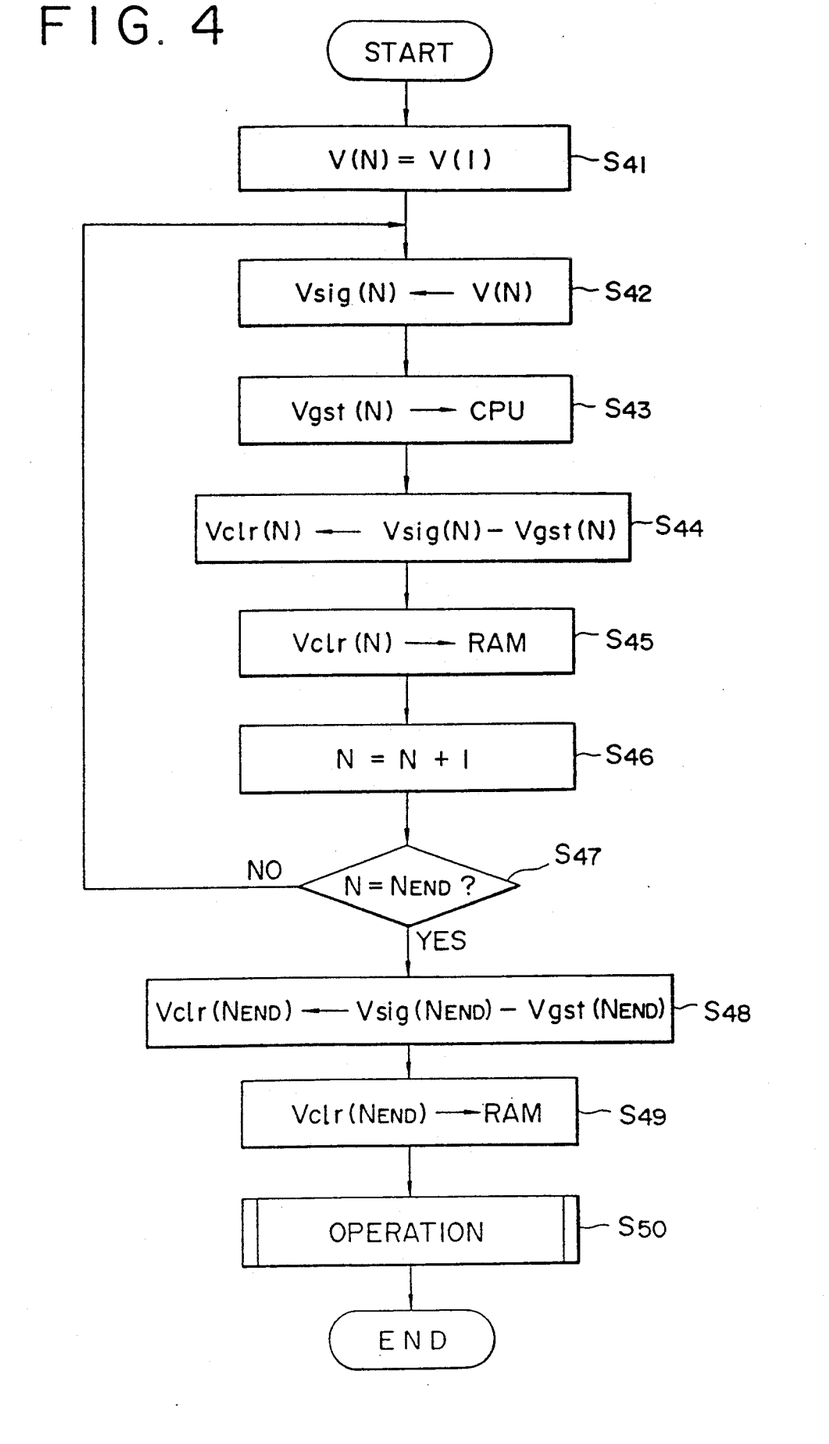

Flow charts for processing of the correction of the video signals are shown in FIG. 3 and FIG. 4.

FIG. 3 shows a process of writing the error data (ghost signals) in the ROM 68.

In FIG. 3, after the process starts, the first bit signal V(1) of the CCD line sensor 63, when the photographer's eye is not placed in front of the finder magnifying lens 44, is read out as a video signal V(N) (Step S31). Then, the video signal V(N) is written to the ROM 68 as a ghost signal Vgst(N) (Step S32, S33). Next, a number N is increased by 1 (Step S34):

At this point the number N is compared with number NENG (Step S35).

If the number N is not equal to the number NEND, the process returns to Step S32. Then, once more, a video signal V(N) is written in the ROM 68 as a ghost signal Vgst(N) (Step S32, S33), and the number N is increased by 1 (Step S34).

If the number N is equal to the Number Nend, video signal V(NEND) is written in the ROM 68 as a ghost signal Vgst (NEND) (Step S36, S37), and the process ends.

Thus, the video signals of the CCD line sensor 63 are repeatedly written in the ROM 68 from the first bit to the NEND bit.

By such a preparation process, all of the ghost signals from the optical units in common are written in the ROM 68. Next, the ghost signals reduction process will be described.

FIG. 4 is an embodiment of the ghost signals reduction process.

In FIG. 4, after the process starts, first bit signal V(1) of the CCD line sensor 63, when the reflection light bundle of the photographer's eye 45 is made incident to the finder magnifying lens 44, is read out as a video signal V(N) (Step S41). Then, the video signal V(N) is taken in the CPU as a video signal Vsig(N) (Step S42).

Next, the ghost signal Vgst(N) is taken in the CPU (Step S43), where N corresponds to the Vsig(N)'s number N, such as, initially being 1.

Then, in the CPU, a clear signal Vclr(N) is calculated by subtracting the ghost signal Vgst(N) from the video signal Vsig (N) (Step S44). The Vclr(N) signal is then memorized in the Ram 69 (Step S45).

Next, the number N is incremented by 1 (Step S46).

Then, the number N is compared with the number NEND (Step S47).

If the number N is not equal to the number NEND, the process returns to Step S42. Then, once more, signal VcLr(N) is calculated by subtracting the ghost signal Vgst(N) from the video signal Vsig(N) (Step S44). The signal Vclr(N) is memorized in the RAM 69 (Step S45) and the number N is increased by 1 (Step S46).

When the number N is equal to the number NEND, signal Vclr(NEND) is calculated by subtracting the ghost signal Vgst(NEND) from the video signal Vsig(NEND) (Step S48). The signal Vclr(NEND) is memorized in the RAM 69 (Step S49).

Thus, the video of the CCD line sensor 63 are written in the RAM 69 in the shape of the clear signal Vclr(N) from the first bit to the NEND bit.

The CPU 67 performs the operation for calculating the revolving angle of the photographer's eye 45, base upon the signal Vclr(N) (Step S50). Then the process ends.

Figure 5:
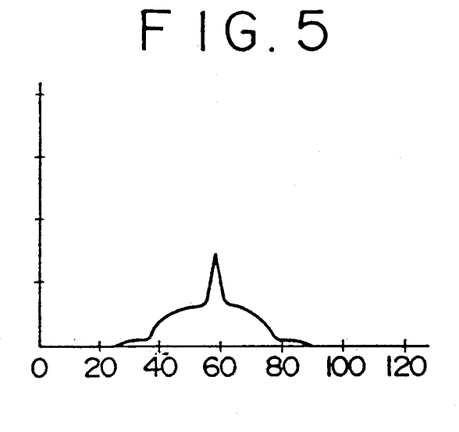
FIG. 5 through FIG. 7 are graphs showing video signals eliminating ghost signals.
Figure 6:
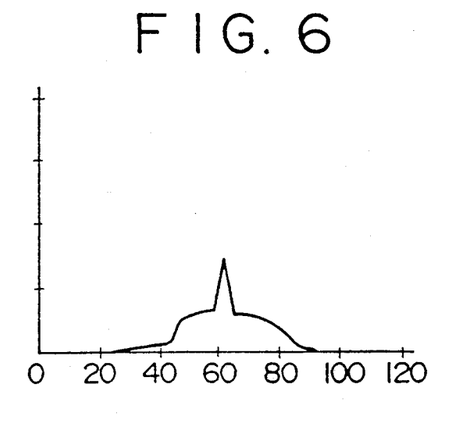
Figure 7:
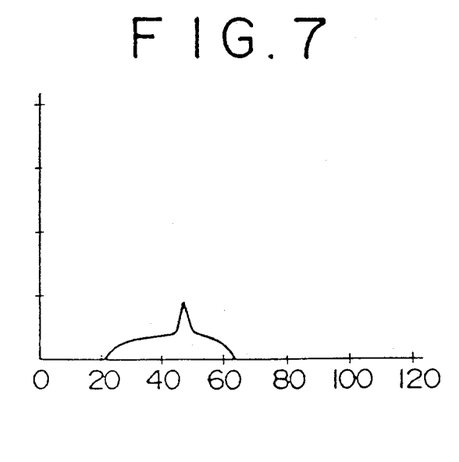

The video signals measured in practice which are corrected by the above-mentioned process based on signals Vclr(N) are shown in FIG. 5 through FIG. 7.

FIG. 5 shows the output video signals when a photographer observes the zone in the center of a finder; FIG. 6 in the right, FIG. 7 in the left. The comparison between these data and the data shown in FIG. 9 through FIG. 11 clearly shows that the elimination of the ghost factors takes off the deformation of the video signals.

Generally the following relationship is concluded:

$$d = k1 \cdot \sin \theta$$

where $\theta$ is a revolving angle of the eye direction from the optical axis of the finder; d is the length of a perpendicular line extending from the center of the pupil to the light line which is made perpendicularly incident to the cornea and which passes through the place of the first Purkinje image PI; and k1 is a distance from the center of the pupil to the center R of curvature of the cornea as shown at lines in FIG. 12. FIG. 12 illustrates a relative gap produced between a center 234 of a pupil of the eye and the first Purkinje image PI, wherein it is presumed that the eye is revolved by angle $\theta$ with respect to optical axis $l_x$.

CPU 67 calculates the length d from the video signals, in which the ghost signals are subtracted, and which are written in the RAM 69, and calculates the revolving angle $\theta$ of the eye from the data of the length k1 and the distance d which are previously settled.

CPU 67 selects the zone placed at the direction where a photographer gazes, based on the revolving angle $\theta$, then outputs the signal which denotes the selected zone to the drive circuit 70. The drive circuit 70 drives one of the CCD 71, 72, and 73, which corresponds to the selected zone. CPU 67 measures the distance to the subject which is intended by the photographer to take it.

An automatic focusing device (not illustrated) is build in a camera, and the device automatically focuses the lens according to the measured distance.

As mentioned above, the eye direction detecting apparatus of this invention makes it possible to electronically eliminate ghost signals of the optical system, and to get the video signals which corresponds to the reflected factors of an eye. Thus, the apparatus of this invention makes it possible to detect the eye direction more exactly.

What is claimed is:

1. An eye direction detecting apparatus, comprising:
    a light emitting system for emitting a detecting light to an eye;
    a light receiving system for detecting a light reflected by said eye and reimaging said light on a light receiving device;
    means for detecting said eye direction by a signal outputted from said light receiving device;
    means for memorizing data represented as ghost signals that are peculiar to an optical system associated with said eye direction detecting apparatus; and
    means for correcting said signal outputted from said light receiving device by said data memorized in said memorizing means.

2. An eye direction detecting apparatus, comprising:
    a light emitting system for emitting a detecting light to an eye of a photographer that gazes through a finder;
    a light receiving system for detecting a light reflected by said eye so as to reimage said light on a light receiving device;
    means for memorizing video signals outputted from said light receiving device as error signals when there is no reflecting light from said eye; and
    means for detecting a gazing direction of said eye by subtracting said error signals memorized in said memorizing means from said video signals outputted from said light receiving device when there is a reflecting light from said eye.

3. An eye direction detecting apparatus according to claim 2, wherein said light emitting system comprises:
    an infrared light emitting diode;
    a total reflection mirror for reflecting an infrared light emitted from said light emitting diode; and
    a collimator lens for converting said infrared light emitted by said light emitting diode into a parallel light bundle.

4. An eye direction detecting apparatus according to claim 2, wherein said light receiving system comprises:
    a compensator prism for compensating optical characteristics, such as the optical path and phase differences of said reflecting light of said eye;
    a minifying lens for shortening the optical path of said light receiving system;
    a total reflection mirror for totally reflecting said light by said minifying lens; and
    a reimaging lens for reimaging said light reflected by said total reflection mirror on a light receiving device which outputs electric signals corresponding to said reimaged light.

5. An eye direction detecting apparatus according to claim 2, wherein said memorizing means comprises an electronically erasable programmable read only memory.

6. An eye direction detecting apparatus according to claim 2, wherein said detecting means detects a revolving angle $\theta$ of said eye direction from the optical axis of said finder based on a relationship:ps
$$d = k1 \cdot \sin \theta$$

where, d is a length of a perpendicular line extending from a center of a pupil to a light line which is made perpendicularly incident to a cornea and which passes through a first Purkinje image; and k1 is a distance from a center of said pupil to a center of curvature of said cornea.

7. An eye direction detecting apparatus according to claim 6, wherein said detecting means selects a zone from a plurality of zones settled in said finder, based upon said revolving angle $\theta$, and then outputs a signal denoting said selected zone.

8. An eye direction detecting apparatus having a detecting optical system which optically detects an eye direction, comprising:
    means for memorizing data representing ghost signals peculiar to an optical system associated with said eye direction detecting apparatus; and
    means for detecting said eye direction by subtracting said data representing said ghost signals memorized in said memorizing means from video signals that are outputted by said detecting optical system.

9. An eye direction detecting apparatus, comprising:
    means for emitting a light beam towards an eye;
    means for receiving a reflected light beam that is reflected by said eye;
    means for detecting a gazing direction of said eye based upon a signal that is outputted by said light receiving means;
    means for storing data representing ghost signals that are peculiar to an optical system associated with said eye direction detecting apparatus; and means for correcting said signal that is outputted by said light receiving device with said data stored in said storing means.

10. An eye direction detecting apparatus, comprising:
a light source that emits a light beam towards an eye of a photographer that gazes through a finder associated with said eye direction detecting apparatus;
a detector that detects a light beam that is reflected by said eye; and
a direction determiner that determines a gazing direction of said eye by subtracting a ghost error signal from a video signal that is outputted by said detector when said light beam is reflected by said eye.

11. An eye direction detecting apparatus, comprising:
a light source that emits a light beam towards an eye of a photographer that gazes through a finder associated with said eye direction detecting apparatus;
a detector that detects a light beam that is reflected by said eye;
a direction determiner that determines a gazing direction of said eye by subtracting an error signal from a video signal that is outputted by said detector when said light beam is reflected by said eye; and
a storage device that stores said video signal that is outputted by said detector as an error signal when no light beam is reflected by said eye.

12. The eye direction detecting apparatus of claim 11, wherein said detector detects a revolving angle $\theta$ of said eye gazing direction with respect to an optical axis of said finder according to an equation:

$$d = k1 \cdot \sin \theta$$

wherein d is a length of a perpendicular line that extends from a center of a pupil of said eye to a light line that is perpendicular to a cornea of said eye and which passes through a first Purkinje image, and k1 is a distance from a center of said pupil of said eye to a center of curvature of said cornea of said eye.

13. The eye direction detecting apparatus of claim 12, wherein said detector selects one zone from a plurality of zones in said finder in response to said revolving angle $\theta$ and outputs a signal identifying said selected zone.

14. The eye direction detecting apparatus of claim 10, wherein said detector detects a revolving angle $\theta$ of said eye gazing direction with respect to an optical axis of said finder according to an equation:

$$d = k1 \cdot \sin \theta$$

wherein d is a length of a perpendicular line that extends from a center of a pupil of said eye to a light line that is perpendicular to a cornea of said eye and which passes through a first Purkinje image, and k1 is a distance from a center of said pupil of said eye to a center of curvature of said cornea of said eye.

15. The eye direction detecting apparatus of claim 14, wherein said detector selects one zone from a plurality of zones in said finder in response to said revolving angle $\theta$ and outputs a signal identifying said selected zone.

* * * * *

UNITED STATES PATENT AND TRADEMARK OFFICE
CERTIFICATE OF CORRECTION

PATENT NO. : 5,260,734
DATED : November 9, 1993
INVENTOR(S) : Osamu Shindo

It is certified that error appears in the above-indentified patent and that said Letters Patent is hereby corrected as shown below:

On the title page, item [56], under "U.S. Patent Documents" add the following —4,574,314  3/86  Weinblatt
          4,636,624  1/87  Ishida—.

On the title page, item [56], under "Foreign Patent Documents add the following —1412707  11/75  United Kingdom—.

On the title page, item [56], under "Other Publications" add the following —"Psychological Physic of Vision" by Mitsuo Ikeda, 1975.—

On the title page, item [56], under "Other Publications" add the following —"Fixation Point Measurement By the Oculometer Technique" by John Merchant, Opticap Engineering, July/August 1974, pages 339-342.—

On the title page, item [56], under "Other Publications" add the following —English Language Abstract of Japanese 60-32012, 2/1985.—

Column 6, line 35, claim 6, change "relationships:ps" to —relationship:—.

Signed and Sealed this

Twenty-fifth Day of July, 1995

Attest:

BRUCE LEHMAN

*Attesting Officer*         *Commissioner of Patents and Trademarks*